(12) United States Patent
Edwards et al.

(10) Patent No.: US 9,796,638 B2
(45) Date of Patent: Oct. 24, 2017

(54) CARBON ARTICLE HAVING AN IMPROVED PRIMER COATING AND AN IMPROVED ANTI-OXIDANT COATING

(71) Applicant: Meggitt Aerospace Limited, Coventry (GB)

(72) Inventors: Craig Edwards, Berkswell (GB); David Callum Johnson, Warwickshire (GB); Andrew Sketchley, Nuneaton (GB)

(73) Assignee: Meggitt Aerospace Limited (GB)

( * ) Notice: Subject to any disclaimer, the term of this patent is extended or adjusted under 35 U.S.C. 154(b) by 155 days.

(21) Appl. No.: 14/734,717

(22) Filed: Jun. 9, 2015

(65) Prior Publication Data

US 2015/0361003 A1    Dec. 17, 2015

(30) Foreign Application Priority Data

Jun. 13, 2014  (GB) .................................. 1410548.0

(51) Int. Cl.
*F16D 65/12* (2006.01)
*C04B 41/85* (2006.01)
(Continued)

(52) U.S. Cl.
CPC ............ *C04B 41/85* (2013.01); *C04B 41/507* (2013.01); *C04B 41/5016* (2013.01); *C04B 41/5035* (2013.01); *C04B 41/5072* (2013.01); *C04B 41/5094* (2013.01); *C04B 41/52* (2013.01); *C04B 41/89* (2013.01); *C09D 5/002* (2013.01); *C09D 5/084* (2013.01); *C09D 7/1216* (2013.01); *F16D 55/00* (2013.01); *F16D 65/12* (2013.01); *F16D 65/126* (2013.01); *F16D 65/127* (2013.01); *F16D 2065/13* (2013.01); *F16D 2200/0039* (2013.01); *F16D 2200/0052* (2013.01); *F16D 2250/0046* (2013.01)

(58) Field of Classification Search
CPC ........... F16D 69/023; F16D 2200/0047; F16D 2250/0046; C04B 41/85; C04B 41/88; C04B 41/89; C04B 41/90; C04B 41/87
See application file for complete search history.

(56) References Cited

U.S. PATENT DOCUMENTS

| 5,759,622 A * | 6/1998 | Stover ................... C04B 41/009 427/249.15 |
| 7,501,181 B2 * | 3/2009 | Walker .................. C04B 41/009 428/408 |

(Continued)

OTHER PUBLICATIONS

Lu, Weiming; Oxidation protection of carbon materials by acid phosphate impregnation (2002); Carbon, vol. 40, pp. 1249-1254.*

*Primary Examiner* — Nicholas J Lane
(74) *Attorney, Agent, or Firm* — Renner, Kenner, Greive, Bobak, Taylor & Weber Co., L.P.A.

(57) ABSTRACT

A carbon article shaped as a brake disc, the brake disc being coated with an anti-oxidant coating obtained by applying as a primer coat a composition including orthophosphoric acid, aluminum hydroxide, demineralized water, and a wetting additive; curing the primer coat; applying as a barrier coat a composition including orthophosphoric acid, aluminum hydroxide, demineralized water, colloidal silica, silicon hexaboride, boron, and a wetting additive; and curing the barrier coat.

9 Claims, 1 Drawing Sheet

(51) Int. Cl.
  *C09D 5/00*   (2006.01)
  *C09D 5/08*   (2006.01)
  *C09D 7/12*   (2006.01)
  *F16D 55/00*  (2006.01)
  *C04B 41/50*  (2006.01)
  *C04B 41/52*  (2006.01)
  *C04B 41/89*  (2006.01)
  *F16D 65/02*  (2006.01)

(56) References Cited

U.S. PATENT DOCUMENTS

| | | | | |
|---|---|---|---|---|
| 8,236,721 B2* | 8/2012 | Zhang | ............... | C09D 5/18 |
| | | | | 106/14.12 |
| 8,962,083 B2* | 2/2015 | Murphy | ............... | C04B 35/6269 |
| | | | | 427/294 |
| 2003/0194574 A1* | 10/2003 | Thebault | ............... | C03C 8/14 |
| | | | | 428/472 |
| 2004/0020728 A1* | 2/2004 | Koucouthakis | ....... | C04B 41/009 |
| | | | | 188/71.1 |
| 2014/0349016 A1* | 11/2014 | Don | ............... | C04B 41/85 |
| | | | | 427/372.2 |
| 2015/0362029 A1* | 12/2015 | Edwards | ............. | C09D 5/002 |
| | | | | 188/218 XL |

* cited by examiner

CARBON ARTICLE HAVING AN IMPROVED PRIMER COATING AND AN IMPROVED ANTI-OXIDANT COATING

FIELD OF THE INVENTION

An aspect of the present invention relates to a carbon article, such as a brake disc, having an anti-oxidant coating. Another aspect of the present invention relates to a carbon anti-oxidant system. Another aspect of the present invention further relates to a primer coat composition. Another aspect of the present invention relates to a carbon anti-oxidant system with a primer coat comprising orthophosphoric acid, aluminum hydroxide, demineralized water, and a wetting additive, and a barrier coat comprising orthophosphoric acid, aluminum hydroxide, demineralized water, a wetting additive, colloidal silica, silicon hexaboride, and boron.

BACKGROUND OF THE INVENTION

One issue with aircraft brake discs made from carbon is that they are prone to suffering from oxidation based on their operating environments. One attempt to protect these brake discs from oxidation involves the use of an anti-oxidant system. Anti-oxidant systems are utilized in brake discs to inhibit both catalytic oxidation and thermal oxidation.

Known anti-oxidant systems include compositions of varying components. These anti-oxidant systems have weaknesses of not addressing the issue of catalytic induced oxidation from runway deicers. The industry is ceasing to use urea deicers for environmental concerns. Instead, potassium and sodium based products are now being utilized. However, both are prone to result in catalytic oxidation of carbon brakes.

Oxidation has a negative effect on brake disc strength. In some cases, the disc may weaken to a point where it is no longer able to transfer torque, resulting in drive tenon failure. Oxidation includes both thermal oxidation and catalytic oxidation.

Thermal oxidation is experienced less frequently, but occurs due to high brake temperatures. Catalytic oxidation occurs due to the combination of chemical contamination and heat. Catalytic oxidation can occur because of cleaning fluid contamination. It has occurred more frequently after the introduction of the new generation runway deicing fluids (RDF's) based on alkali metals, acetate, and formates. Operators with route structures, where the brakes come into contact with these chemicals, experience more occurrences of catalytic oxidation. The effects of oxidation are not always immediately apparent, as the disc must be subject to elevated temperature for a certain time in order for the oxidation to fully develop.

There are growing concerns across the industry regarding the effect of RDF's on carbon brakes, particularly with respect to oxidation. The EASA and FAA have informed operators about the effects of oxidation and have suggested that carbon brake discs be inspected for signs of oxidation.

Thus, a need in the art exists for an improved carbon anti-oxidant coating for application on a carbon brake disc. An aspect of the present invention advances the art by providing an anti-oxidant coating and a carbon brake disc having an anti-oxidant coating that offer improved properties. Another aspect of the present invention also provides an improved primer coat composition.

SUMMARY OF THE INVENTION

In a first embodiment, the present invention provides a carbon article formed as a brake disc, the brake disc being coated with an anti-oxidant coating, the anti-oxidant coating, as applied, comprising aluminum phosphate, wherein the aluminum phosphate is formed by reacting orthophosphoric acid with aluminum hydroxide; demineralized water and a wetting additive; and colloidal silica, silicon hexaboride, and boron.

In a second embodiment, the present invention provides a carbon article as in the first embodiment, wherein the anti-oxidant coating comprises aluminum phosphate in an amount from 5% to 25%.

In a third embodiment, the present invention provides a carbon article as in either the first or second embodiments, wherein the anti-oxidant coating comprises demineralized water in an amount from 25% to 45%, the wetting additive in an amount from 0.1% to 1%, and colloidal silica in an amount from 10% to 25%.

In a fourth embodiment, the present invention provides a carbon article as in any of the first through third embodiments, wherein the anti-oxidant coating comprises silicon hexaboride in an amount from 0.01% to 30% and boron in an amount from 0.01% to 30%.

In a fifth embodiment, the present invention provides a carbon article as in any of the first through fourth embodiments, wherein the anti-oxidant coating further comprises industrial methylated spirits.

In a sixth embodiment, the present invention provides a carbon article shaped as a brake disc, the brake disc being coated with an anti-oxidant coating obtained by applying as a primer coat a composition comprising orthophosphoric acid, aluminum hydroxide, demineralized water, and a wetting additive; curing the primer coat; applying as a barrier coat a composition comprising orthophosphoric acid, aluminum hydroxide, demineralized water, colloidal silica, silicon hexaboride, boron, and a wetting additive; and curing the barrier coat.

In a seventh embodiment, the present invention provides a carbon article as in the first sixth embodiment, wherein the pre-cured primer coat comprises orthophosphoric acid in an amount from 45% to 65%, aluminum hydroxide in an amount from 5% to 15%, demineralized water in an amount from 20% to 45%, and the wetting additive in an amount from 0.1% to 1%.

In an eighth embodiment, the present invention provides a carbon article as in either the sixth or seventh embodiments, wherein the pre-cured barrier coat comprises orthophosphoric acid in an amount from 20% to 40%, aluminum hydroxide in an amount from 3% to 9%, colloidal silica in an amount from 10% to 25%, demineralized water in an amount from 10% to 25%, silicon hexaboride in an amount from 0.01% to 30%, boron in an amount from 0.01% to 30%, and a wetting additive in an amount from 0.05% to 0.6%.

In a ninth embodiment, the present invention provides a carbon article as in any of the sixth through eighth embodiments, wherein the pre-cured primer coat further comprises an additional component selected from the group consisting of colloidal silica, industrial methylated spirits, and combinations thereof.

In a tenth embodiment, the present invention provides a carbon anti-oxidant system, as applied, comprising a primer coat composition comprising orthophosphoric acid, aluminum hydroxide, demineralized water, and a wetting additive; and a barrier coat composition comprising orthophosphoric acid, aluminum hydroxide, demineralized water, colloidal silica, silicon hexaboride, boron, and a wetting additive.

In an eleventh embodiment, the present invention provides a carbon anti-oxidant system as in the first tenth embodiment, wherein the primer coat comprises orthophosphoric acid in an amount from 45% to 65%, aluminum hydroxide in an amount from 5% to 15%, demineralized water in an amount from 20% to 45%, and the wetting additive in an amount from 0.1% to 1.0%.

In a twelfth embodiment, the present invention provides a carbon anti-oxidant system as in either the tenth or eleventh embodiments, wherein the barrier coat comprises orthophosphoric acid in an amount from 20% to 40%, aluminum hydroxide in an amount from 3% to 9%, colloidal silica in an amount from 10% to 25%, silicon hexaboride in an amount from 0.01% to 30%, boron in an amount from 0.01% to 30%, and the wetting additive in an amount from 0.05% to 0.6%.

In a thirteenth embodiment, the present invention provides a carbon anti-oxidant system as in any of the tenth through twelfth embodiments, wherein the primer coat further comprises an additional component selected from the group consisting of colloidal silica, industrial methylated spirits, and combinations thereof.

In a fourteenth embodiment, the present invention provides a primer coat composition, comprising orthophosphoric acid, aluminum hydroxide, demineralized water, and a wetting additive.

In a fifteenth embodiment, the present invention provides a primer coat composition as in the fourteenth embodiment, wherein the primer coat composition comprises orthophosphoric acid in an amount from 45% to 65% and aluminum hydroxide in an amount from 5% to 15%.

In a sixteenth embodiment, the present invention provides a primer coat composition as in either the fourteenth or fifteenth embodiments, wherein the primer coat comprises demineralized water in an amount from 20% to 45% and the wetting additive in an amount from 0.1% to 1.0%.

In a seventeenth embodiment, the present invention provides a primer coat composition as in any of the fourteenth through sixteenth embodiments, wherein the primer coat further comprises an additional component selected from the group consisting of colloidal silica, industrial methylated spirits, and combinations thereof.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATIVE EMBODIMENTS

Figure 1:
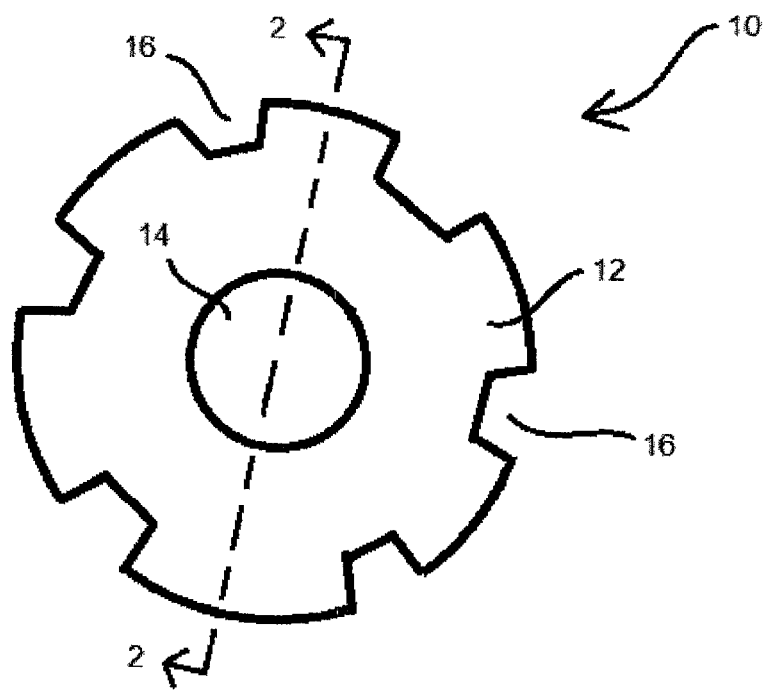
FIG. 1 is a top plan view of a brake disc made according to the invention.

With reference now to FIG. 1 of the drawings, it can be seen that a carbon article, such as an aircraft brake disc, is designated generally by the numeral 10. Although a rotor disc is shown, the invention also applies to stator discs, as well as a host of other carbon products. The rotor disc 10 has a body 12 with a central annulus 14 for receiving a wheel axle. Keyways 16 are provided about the periphery for operative engagement with an aircraft wheel.

Figure 2:
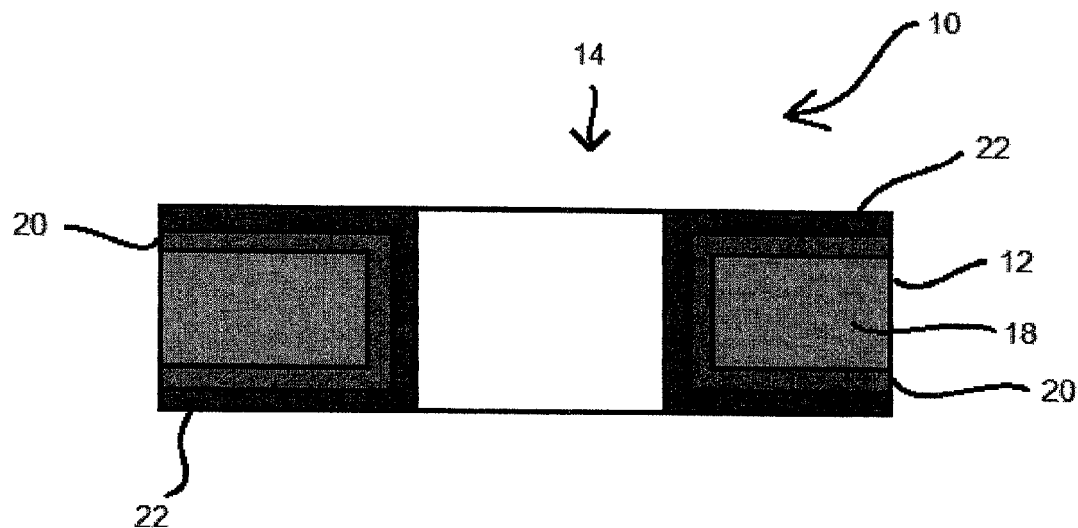
FIG. 2 is a cross-sectional view of the brake disc of FIG. 1, taken along the line 2-2.

In FIG. 2, there is provided a cross-sectional view of the disc of FIG. 1, showing the basic elements of the invention described below. The body has a carbon base 18, coated with an anti-oxidant coating having a primer coat 20 adhered directly to the carbon, and a barrier coat 22 bonded to the primer coat 20.

An embodiment of the present invention relates to a carbon article, such as a carbon brake disc, that is coated with an anti-oxidation coating. An embodiment of the present invention further relates to a carbon anti-oxidant coating or system. An embodiment of the present invention further relates to a primer coat composition.

In one or more embodiments, a primer coat composition comprises orthophosphoric acid, aluminum hydroxide, demineralized water, and a wetting additive. In one or more embodiments, an anti-oxidant system comprises a primer coat and a barrier coat. In one or more embodiments, a primer coat comprises orthophosphoric acid, aluminum hydroxide, demineralized water, and a wetting additive and a barrier coat comprises orthophosphoric acid, aluminum hydroxide, demineralized water, a wetting additive, colloidal silica, silicon hexaboride, and boron. In one or more embodiments, a primer coat further comprises colloidal silica, industrial methylated spirits, or a combination thereof. In one or more embodiments, a primer coat consists of orthophosphoric acid, aluminum hydroxide, demineralized water, and a wetting additive. In one or more embodiments, a primer coat consists of orthophosphoric acid, aluminum hydroxide, demineralized water, and a wetting additive, and a barrier coat consists of orthophosphoric acid, aluminum hydroxide, demineralized water, a wetting additive, colloidal silica, silicon hexaboride, and boron. In one or more embodiments, a primer coat further consists of colloidal silica, industrial methylated spirits, or a combination thereof. In one or more embodiments, a carbon brake disc is coated with a primer coat and barrier coat.

Embodiments of the present invention offer improved properties over the known art. One advantage is that an improved primer coat and an improved carbon anti-oxidant system provide better protection of carbon brakes. This improved protection is accomplished by improving the properties of carbon brake surface coverage, thermal cycling, and glazing and re-sealing at elevated temperatures.

The primer coat composition, carbon anti-oxidant coating, and carbon brakes that are coated with the primer coat composition and anti-oxidant coating, will now be described in greater detail. It should be noted that the specific materials and the specific process conditions disclosed in the following disclosures are given only as examples within the scope of the invention, and this invention should not be limited to these materials or process conditions as such.

In one or more embodiments, a primer coat composition is provided. In one or more embodiments, a carbon anti-oxidant system comprises two coating layers. In one or more embodiments, a carbon anti-oxidant system comprises a primer coat and a barrier coat. A primer coat of a carbon anti-oxidant system generally functions to protect a carbon brake from catalytic oxidation.

A primer coat is the first coat that is applied to a carbon brake. As such, it is desired that a primer coat is able to infiltrate the pores of a carbon brake in order to better protect the pores against oxidation. A primer coat is able to block or partially block the pores of the carbon brake, which mitigates the effects of catalytic oxidation. In one or more embodiments, a carbon anti-oxidant system comprises a primer coat having active ingredients that react to form a product, where the reaction product blocks, or partially blocks, the pores of a carbon brake disc.

In one or more embodiments, a carbon anti-oxidant system comprises a primer coat that comprises orthophosphoric acid (also known as phosphoric acid) and aluminum hydroxide. The orthophosphoric acid and aluminum hydroxide react to form aluminum phosphate and water in the reaction:

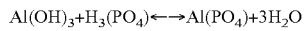

$$Al(OH)_3 + H_3(PO_4) \leftrightarrow Al(PO_4) + 3H_2O$$

The objective of a primer coat is to form the aluminum phosphate from the solution during drying and curing, rather than by a precipitation reaction during mixing or application of the solution. Forming the aluminum phosphate during drying and curing results in the aluminum phosphate being cured in the carbon brake's exposed surfaces and open pores. This results in the surfaces and pores being blocked or partially blocked, which thereby mitigates the effects of oxidation, particularly catalytic oxidation. Blocking the surfaces and pores results in the catalyst particles being unable to enter the carbon brake's surfaces and pores.

In addition to achieving this reaction, it is theorized that embodiments having excess orthophosphoric acid provide additional protection against oxidation. It is believed that excess orthophosphoric acid will form phosphate glass. The phosphate glass then acts as a barrier and protects, or neutralizes, the carbon brake from catalytic oxidation, specifically protecting against catalysts used as runway deicers such as potassium acetates, potassium formates, sodium acetates, and sodium formates.

In one or more embodiments, a primer coat comprises 10 wt. % or more orthophosphoric acid, in other embodiments, a primer coat comprises 20 wt. % or more orthophosphoric acid, in yet other embodiments, a primer coat comprises 30 wt. % or more orthophosphoric acid, and in still other embodiments, a primer coat comprises 45 wt. % or more orthophosphoric acid, based upon the total weight of the primer coat.

In one or more embodiments, a primer coat comprises 70 wt. % or less orthophosphoric acid, in other embodiments, a primer coat comprises 60 wt. % or less orthophosphoric acid, in yet other embodiments, a primer coat comprises 55 wt. % or less orthophosphoric acid, and in still other embodiments, a primer coat comprises 45 wt. % or less orthophosphoric acid, based upon the total weight of the primer coat.

In one or more embodiments, a primer coat comprises 10 wt. % or more to 70 wt. % or less orthophosphoric acid, in other embodiments, a primer coat comprises 20 wt. % or more to 60 wt. % or less orthophosphoric acid, in yet other embodiments, a primer coat comprises 30 wt. % or more to 55 wt. % or less orthophosphoric acid, and in still other embodiments, a primer coat comprises 45 wt. % or more to 65 wt. % or less orthophosphoric acid, based upon the total weight of the primer coat.

In one or more embodiments, a primer coat comprises 1 wt. % or more aluminum hydroxide, in other embodiments, a primer coat comprises 5 wt. % or more aluminum hydroxide, in yet other embodiments, a primer coat comprises 6 wt. % or more aluminum hydroxide, and in still other embodiments, a primer coat comprises 7 wt. % or more aluminum hydroxide, based upon the total weight of the primer coat.

In one or more embodiments, a primer coat comprises 15 wt. % or less aluminum hydroxide, in other embodiments, a primer coat comprises 11 wt. % or less aluminum hydroxide, in yet other embodiments, a primer coat comprises 9 wt. % or less aluminum hydroxide, and in still other embodiments, a primer coat comprises 8 wt. % or less aluminum hydroxide, based upon the total weight of the primer coat.

In one or more embodiments, a primer coat comprises 1 wt. % or more to 15 wt. % or less aluminum hydroxide, in other embodiments, a primer coat comprises 5 wt. % or more to 15 wt. % or less aluminum hydroxide, in yet other embodiments, a primer coat comprises 6 wt. % or more to 11 wt. % or less aluminum hydroxide, and in still other embodiments, a primer coat comprises 7 wt. % or more to 8 wt. % or less aluminum hydroxide, based upon the total weight of the primer coat.

In one or more embodiments, a carbon anti-oxidant system comprises a primer coat that comprises demineralized water. Demineralized water is water that has had its mineral ions removed, such as sodium, calcium, iron, copper, chloride and sulfate. Methods of making and obtaining demineralized water are generally known in the art. One function of the demineralized water is to react with industrial methylated spirits.

In one or more embodiments, a primer coat comprises 20 wt. % or more demineralized water, in other embodiments, a primer coat comprises 25 wt. % or more demineralized water, in yet other embodiments, a primer coat comprises 35 wt. % or more demineralized water, and in still other embodiments, a primer coat comprises 40 wt. % or more demineralized water, based upon the total weight of the primer coat.

In one or more embodiments, a primer coat comprises 60 wt. % or less demineralized water, in other embodiments, a primer coat comprises 55 wt. % or less demineralized water, in yet other embodiments, a primer coat comprises 50 wt. % or less demineralized water, and in still other embodiments, a primer coat comprises 45 wt. % or less demineralized water, based upon the total weight of the primer coat.

In one or more embodiments, a primer coat comprises 20 wt. % or more to 60 wt. % or less demineralized water, in other embodiments, a primer coat comprises 25 wt. % or more to 55 wt. % or less demineralized water, in yet other embodiments, a primer coat comprises 35 wt. % or more to 50 wt. % or less demineralized water, and in still other embodiments, a primer coat comprises 20 wt. % or more to 45 wt. % or less demineralized water, based upon the total weight of the primer coat.

In one or more embodiments, a carbon anti-oxidant system comprises a primer coat that comprises a wetting additive. Suitable wetting additives are based on modified siloxanes. The function of a wetting additive is to improve substrate wetting due to a reduction of surface tension. Wetting additives also improve flow and leveling, which results in better coating uniformity. Examples of suitable wetting additives include BYK® 348 and BYK® 346, which can be referred to as polyether modified siloxanes. Wetting additives can also be described as silicone surfactants.

In one or more embodiments, a primer coat comprises 0.01 wt. % or more wetting additive, in other embodiments, a primer coat comprises 0.05 wt. % or more wetting additive, in yet other embodiments, a primer coat comprises 0.1 wt. % or more wetting additive, and in still other embodiments, a primer coat comprises 0.15 wt. % or more wetting additive, based upon the total weight of the primer coat.

In one or more embodiments, a primer coat comprises 1 wt. % or less wetting additive, in other embodiments, a primer coat comprises 0.8 wt. % or less wetting additive, in yet other embodiments, a primer coat comprises 0.6 wt. % or less wetting additive, and in still other embodiments, a primer coat comprises 0.4 wt. % or less wetting additive, based upon the total weight of the primer coat.

In one or more embodiments, a primer coat comprises 0.01 wt. % or more to 1 wt. % or less wetting additive, in other embodiments, a primer coat comprises 0.05 wt. % or more to 0.8 wt. % or less wetting additive, in yet other embodiments, a primer coat comprises 0.1 wt. % or more to 1 wt. % or less wetting additive, and in still other embodiments, a primer coat comprises 0.2 wt. % or more to 0.4 wt. % or less wetting additive, based upon the total weight of the primer coat.

In one or more embodiments, a carbon anti-oxidant system comprises a primer coat that comprises colloidal silica. Colloidal silica is a glass that acts as a binder to provide adhesion for a barrier coat, as well as adhesion between a primer coat and barrier coat. Silica glass generally forms at a higher temperature than boron glass. Boron silicate glass generally forms at a temperature in between silica glass and boron glass.

Colloidal silica also has the ability to glaze and reseal at elevated temperatures. This glazing and resealing is particularly relevant as a carbon heat sink is subjected to thermal cycling. The colloidal silica can exist as layers, which offers further protection for a carbon brake surface upon glazing and resealing. Colloidal silica also allows for the viscosity to be controlled.

The particles of colloidal silica are generally very fine. In one or more embodiments, the colloidal silica has an average particle size of from 10 nm or more to 100 nm or less. This fineness allows the particles to fill the pores of a carbon brake surface based on sufficient dispersion properties. One example of a suitable colloidal silica is LEVASIL® 200N.

In one or more embodiments, a primer coat comprises 0.1 wt. % or more colloidal silica, in other embodiments, a primer coat comprises 0.5 wt. % or more colloidal silica, in yet other embodiments, a primer coat comprises 1 wt. % or more colloidal silica, and in still other embodiments, a primer coat comprises 2 wt. % or more colloidal silica, based upon the total weight of the primer coat.

In one or more embodiments, a primer coat comprises 6 wt. % or less colloidal silica, in other embodiments, a primer coat comprises 5 wt. % or less colloidal silica, in yet other embodiments, a primer coat comprises 4 wt. % or less colloidal silica, and in still other embodiments, a primer coat comprises 3 wt. % or less colloidal silica, based upon the total weight of the primer coat.

In one or more embodiments, a primer coat comprises 0.1 wt. % or more to 6 wt. % or less colloidal silica, in other embodiments, a primer coat comprises 0.5 wt. % or more to 5 wt. % or less colloidal silica, in yet other embodiments, a primer coat comprises 0.1 wt. % or more to 1 wt. % or less colloidal silica, and in still other embodiments, a primer coat comprises 2 wt. % or more to 3 wt. % or less colloidal silica, based upon the total weight of the primer coat.

In one or more embodiments, a carbon anti-oxidant system comprises a primer coat that comprises industrial methylated spirits. Industrial methylated spirits (IMS), or denatured alcohol, is essentially alcohol with an additive.

The IMS gives a primer coat a quick drying characteristic without impairing performance. Water-based systems that lack IMS tend to dry slowly. In these systems, when the temperature is raised to speed the drying, some of the active ingredients are lost and performance is impaired. Systems having IMS are quick drying without impacting the performance of the systems.

In one or more embodiments, a primer coat comprises 1 wt. % or more industrial methylated spirits, in other embodiments, a primer coat comprises 2 wt. % or more industrial methylated spirits, in yet other embodiments, a primer coat comprises 3 wt. % or more industrial methylated spirits, and in still other embodiments, a primer coat comprises 4 wt. % or more industrial methylated spirits, based upon the total weight of the primer coat.

In one or more embodiments, a primer coat comprises 20 wt. % or less industrial methylated spirits, in other embodiments, a primer coat comprises 15 wt. % or less industrial methylated spirits, in yet other embodiments, a primer coat comprises 10 wt. % or less industrial methylated spirits, and in still other embodiments, a primer coat comprises 5 wt. % or less industrial methylated spirits, based upon the total weight of the primer coat.

In one or more embodiments, a primer coat comprises 1 wt. % or more to 20 wt. % or less industrial methylated spirits, in other embodiments, a primer coat comprises 2 wt. % or more to 15 wt. % or less industrial methylated spirits, in yet other embodiments, a primer coat comprises 3 wt. % or more to 10 wt. % or less industrial methylated spirits, and in still other embodiments, a primer coat comprises 1 wt. % or more to 5 wt. % or less industrial methylated spirits, based upon the total weight of the primer coat.

In one or more embodiments, after a primer coat is added to the carbon brake and is sufficiently dried, a barrier coat is added to the brake. A barrier coat generally functions to protect against both catalytic oxidation and thermal oxidation, but is especially significant for providing high temperature thermal oxidation protection. As a barrier coat is applied after a primer coat, it can also be referred to as the top coat.

In one or more embodiments, a barrier coat contains all of the ingredients found in a primer coat along with additional components. In embodiments where ingredients in a primer coat are replicated, it is believed that three benefits are achieved: ensuring that the surface has sufficient primer coverage to the extent that a primer coat misses areas of the surface, providing solids to the barrier coat that are cured and act as a binder to help top coat adhesion, and improving adhesion between the primer coat and barrier coat. In one or more embodiments, a primer coat components have about 10% solids.

In one or more embodiments, a barrier coat comprises 5 wt. % or more to 70 wt. % or less of a primer coat composition, in other embodiments, a barrier coat comprises 10 wt. % or more to 60 wt. % or less of a primer coat composition, in yet other embodiments, a barrier coat comprises 20 wt. % or more to 55 wt. % or less of a primer coat composition, and in still other embodiments, a barrier coat comprises 50 wt. % or more to 60 wt. % or less of a primer coat composition, based upon the total weight of the barrier coat.

In one or more embodiments, a carbon anti-oxidant system comprises a barrier coat that comprises orthophosphoric acid (also known as phosphoric acid) and aluminum hydroxide. The properties of the orthophosphoric acid and aluminum hydroxide in a barrier coat are as described above, other than the amount present.

In one or more embodiments, a barrier coat comprises 5 wt. % or more orthophosphoric acid, in other embodiments, a barrier coat comprises 10 wt. % or more orthophosphoric acid, in yet other embodiments, a barrier coat comprises 12 wt. % or more orthophosphoric acid, and in still other embodiments, a barrier coat comprises 15 wt. % or more orthophosphoric acid, based upon the total weight of the barrier coat.

In one or more embodiments, a barrier coat comprises 45 wt. % or less orthophosphoric acid, in other embodiments, a barrier coat comprises 40 wt. % or less orthophosphoric acid, in yet other embodiments, a barrier coat comprises 35 wt. % or less orthophosphoric acid, and in still other embodiments, a barrier coat comprises 30 wt. % or less orthophosphoric acid, based upon the total weight of the barrier coat.

In one or more embodiments, a barrier coat comprises 5 wt. % or more to 45 wt. % or less orthophosphoric acid, in other embodiments, a barrier coat comprises 10 wt. % or more to 35 wt. % or less orthophosphoric acid, in yet other embodiments, a barrier coat comprises 25 wt. % or more to 40 wt. % or less orthophosphoric acid, and in still other embodiments, a barrier coat comprises 15 wt. % or more to 30 wt. % or less orthophosphoric acid, based upon the total weight of the barrier coat.

In one or more embodiments, a barrier coat comprises 1 wt. % or more aluminum hydroxide, in other embodiments, a barrier coat comprises 2 wt. % or more aluminum hydroxide, in yet other embodiments, a barrier coat comprises 3 wt. % or more aluminum hydroxide, and in still other embodiments, a barrier coat comprises 4 wt. % or more aluminum hydroxide, based upon the total weight of the barrier coat.

In one or more embodiments, a barrier coat comprises 10 wt. % or less aluminum hydroxide, in other embodiments, a barrier coat comprises 8 wt. % or less aluminum hydroxide, in yet other embodiments, a barrier coat comprises 7 wt. % or less aluminum hydroxide, and in still other embodiments, a barrier coat comprises 5 wt. % or less aluminum hydroxide, based upon the total weight of the barrier coat.

In one or more embodiments, a barrier coat comprises 1 wt. % or more to 10 wt. % or less aluminum hydroxide, in other embodiments, a barrier coat comprises 2 wt. % or more to 8 wt. % or less aluminum hydroxide, in yet other embodiments, a barrier coat comprises 3 wt. % or more to 10 wt. % or less aluminum hydroxide, and in still other embodiments, a barrier coat comprises 4 wt. % or more to 5 wt. % or less aluminum hydroxide, based upon the total weight of the barrier coat.

In one or more embodiments, a carbon anti-oxidant system comprises a barrier coat that comprises demineralized water. The properties of the demineralized water in a barrier coat are as described above, other than the amount present.

In one or more embodiments, a barrier coat comprises 5 wt. % or more demineralized water, in other embodiments, a barrier coat comprises 10 wt. % or more demineralized water, in yet other embodiments, a barrier coat comprises 15 wt. % or more demineralized water, and in still other embodiments, a barrier coat comprises 20 wt. % or more demineralized water, based upon the total weight of the barrier coat.

In one or more embodiments, a barrier coat comprises 40 wt. % or less demineralized water, in other embodiments, a barrier coat comprises 35 wt. % or less demineralized water, in yet other embodiments, a barrier coat comprises 30 wt. % or less demineralized water, and in still other embodiments, a barrier coat comprises 25 wt. % or less demineralized water, based upon the total weight of the barrier coat.

In one or more embodiments, a barrier coat comprises 10 wt. % or more to 40 wt. % or less demineralized water, in other embodiments, a barrier coat comprises 10 wt. % or more to 25 wt. % or less demineralized water, in yet other embodiments, a barrier coat comprises 15 wt. % or more to 30 wt. % or less demineralized water, and in still other embodiments, a barrier coat comprises 20 wt. % or more to 25 wt. % or less demineralized water, based upon the total weight of the barrier coat.

In one or more embodiments, a carbon anti-oxidant system comprises a barrier coat that comprises colloidal silica. The properties of the colloidal silica in a barrier coat are as described above, other than the amount present.

In one or more embodiments, a barrier coat comprises 5 wt. % or more colloidal silica, in other embodiments, a barrier coat comprises 10 wt. % or more colloidal silica, in yet other embodiments, a barrier coat comprises 20 wt. % or more colloidal silica, and in still other embodiments, a barrier coat comprises 22 wt. % or more colloidal silica, based upon the total weight of the barrier coat.

In one or more embodiments, a barrier coat comprises 45 wt. % or less colloidal silica, in other embodiments, a barrier coat comprises 40 wt. % or less colloidal silica, in yet other embodiments, a barrier coat comprises 35 wt. % or less colloidal silica, and in still other embodiments, a barrier coat comprises 25 wt. % or less colloidal silica, based upon the total weight of the barrier coat.

In one or more embodiments, a barrier coat comprises 5 wt. % or more to 45 wt. % or less colloidal silica, in other embodiments, a barrier coat comprises 10 wt. % or more to 25 wt. % or less colloidal silica, in yet other embodiments, a barrier coat comprises 20 wt. % or more to 35 wt. % or less colloidal silica, and in still other embodiments, a barrier coat comprises 22 wt. % or more to 25 wt. % or less colloidal silica, based upon the total weight of the barrier coat.

In one or more embodiments, a carbon anti-oxidant system comprises a barrier coat that comprises silicon hexaboride (also known as boron silicide). Silicon hexaboride has the chemical formula $SiB_6$ and forms glasses from both the silicon and boron present in the compound. Silicon hexaboride forms glasses by combining with available oxygen.

The softening point of silicon glass is inconveniently high relative to the thermal duty cycle of a carbon brake heat sink. The softening point of boron glass covers the lower temperatures of a typical carbon brake heat sink. Glasses that contain both boron and silicon, such as borosilicate glasses, generally have softening points in between the high softening points of silicon glass and the low softening points of boron glass.

Carbon anti-oxidant systems comprising barrier coats that comprise boron and colloidal silica will form the glasses containing both boron and silicon that bridge the gap in softening points. However, a performance advantage is noticed when a barrier coat comprises silicon hexaboride. One theory for this is that since the silicon and boron exist as a compound, the glass forming is quicker, and therefore the resulting composition is more precisely targeted to a typical aircraft heat sink duty cycle.

It should be noted that silicon hexaboride is an expensive product. In one or more embodiments, the silicon hexaboride is replaced with a less expensive product that accomplishes the same functions. Suitable replacements for the silicon hexaboride may include boron, silicon, boric oxide and the like, and mixtures thereof.

In one or more embodiments, a barrier coat comprises 0.01 wt. % or more silicon hexaboride, in other embodiments, a barrier coat comprises 10 wt. % or more silicon hexaboride, in yet other embodiments, a barrier coat comprises 15 wt. % or more silicon hexaboride, and in still other embodiments, a barrier coat comprises 20 wt. % or more silicon hexaboride, based upon the total weight of the barrier coat.

In one or more embodiments, a barrier coat comprises 40 wt. % or less silicon hexaboride, in other embodiments, a barrier coat comprises 35 wt. % or less silicon hexaboride, in yet other embodiments, a barrier coat comprises 30 wt. % or less silicon hexaboride, and in still other embodiments, a barrier coat comprises 25 wt. % or less silicon hexaboride, based upon the total weight of the barrier coat.

In one or more embodiments, a barrier coat comprises 0.01 wt. % or more to 30 wt. % or less silicon hexaboride, in other embodiments, a barrier coat comprises 10 wt. % or more to 35 wt. % or less silicon hexaboride, in yet other embodiments, a barrier coat comprises 15 wt. % or more to 30 wt. % or less silicon hexaboride, and in still other embodiments, a barrier coat comprises 20 wt. % or more to 25 wt. % or less silicon hexaboride, based upon the total weight of the barrier coat.

In one or more embodiments, a carbon anti-oxidant system comprises a barrier coat that comprises boron. In one or more embodiments, boron is in the form of elemental boron. In one or more embodiments, boron is in a crystalline form. In one or more embodiments, boron is in an amorphous form. As used herein, it should be appreciated that the term boron is defined as consisting substantially of boron. It should be appreciated that certain forms of boron can include small amounts of other elements, such as carbon.

The boron reacts with available oxygen to form glass. The glass then has the ability to glaze and reseal at elevated temperatures as described above. This glazing and resealing offers further protection when the carbon heat sink is subjected to thermal cycling. In combining with some of the available oxygen, the boron further protects the carbon brake by preventing this oxygen from reacting with the carbon in the brake.

In one or more embodiments, a barrier coat comprises 0.01 wt. % or more boron, in other embodiments, a barrier coat comprises 2 wt. % or more boron, in yet other embodiments, a barrier coat comprises 5 wt. % or more boron, and in still other embodiments, a barrier coat comprises 10 wt. % or more boron, based upon the total weight of the barrier coat.

In one or more embodiments, a barrier coat comprises 35 wt. % or less boron, in other embodiments, a barrier coat comprises 30 wt. % or less boron, in yet other embodiments, a barrier coat comprises 25 wt. % or less boron, and in still other embodiments, a barrier coat comprises 20 wt. % or less boron, based upon the total weight of the barrier coat.

In one or more embodiments, a barrier coat comprises 0.01 wt. % or more to 30 wt. % or less boron, in other embodiments, a barrier coat comprises 2 wt. % or more to 30 wt. % or less boron, in yet other embodiments, a barrier coat comprises 5 wt. % or more to 25 wt. % or less boron, and in still other embodiments, a barrier coat comprises 10 wt. % or more to 20 wt. % or less boron, based upon the total weight of the barrier coat.

In one or more embodiments, a carbon anti-oxidant system comprises a barrier coat that comprises a wetting additive. The properties of the wetting additive in a barrier coat are as described above, other than the amount present.

In one or more embodiments, a barrier coat comprises 0.01 wt. % or more wetting additive, in other embodiments, a barrier coat comprises 0.05 wt. % or more wetting additive, in yet other embodiments, a barrier coat comprises 0.1 wt. % or more wetting additive, and in still other embodiments, a barrier coat comprises 0.2 wt. % or more wetting additive, based upon the total weight of the barrier coat.

In one or more embodiments, a barrier coat comprises 1 wt. % or less wetting additive, in other embodiments, a barrier coat comprises 0.8 wt. % or less wetting additive, in yet other embodiments, a barrier coat comprises 0.6 wt. % or less wetting additive, and in still other embodiments, a barrier coat comprises 0.4 wt. % or less wetting additive, based upon the total weight of the barrier coat.

In one or more embodiments, a barrier coat comprises 0.01 wt. % or more to 1 wt. % or less wetting additive, in other embodiments, a barrier coat comprises 0.05 wt. % or more to 0.8 wt. % or less wetting additive, in yet other embodiments, a barrier coat comprises 0.1 wt. % or more 1 wt. % or less wetting additive, and in still other embodiments, a barrier coat comprises 0.2 wt. % or more to 0.4 wt. % or less wetting additive, based upon the total weight of the barrier coat.

In one or more embodiments, a carbon article is formed as a brake disc and the brake disc is coated with an anti-oxidant coating. In one or more embodiments, an anti-oxidant coating comprises a composition comprising the products of curing a primer coat and a barrier coat.

In one or more embodiments, an anti-oxidant coating comprises 5 wt. % or more to 25 wt. % or less aluminum phosphate, in other embodiments, an anti-oxidant coating comprises 10 wt. % or more to 20 wt. % or less aluminum phosphate, in yet other embodiments, an anti-oxidant coating comprises 12 wt. % or more to 18 wt. % or less aluminum phosphate, and in still other embodiments, an anti-oxidant coating comprises 15 wt. % or more to 17 wt. % or less aluminum phosphate, based upon the total weight of the anti-oxidant coating. These percentages are based on the applied (i.e. wet or uncured) primer coat.

In light of the foregoing, it should be appreciated that the present invention advances the art. An aspect of the present invention improves the art by providing an improved anti-oxidant system and improved primer coat composition protective of potassium and sodium based deicers. Another aspect of the present invention provides carbon articles, such as brake discs, that are coated with an improved anti-oxidant coating. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Control: The starting point for comparison was a baseline anti-oxidant system. These baseline samples were coated, cured, dipped (for 30 minutes in a 25 w/w potassium acetate solution), and dried. The samples were then oxidation tested in still air at 550° C. for 8 hours and recorded an average weight loss of 15%.

Primer Coat 1 (CE023W): In one example, 20 g of aluminum hydroxide was combined with 95 g of orthophosphoric acid. This combination was placed on a beaker on a hot plate. 65 g of demineralised water was added while stirring. The combination was allowed to cool, then a mixture of 3 g of IMS and 0.35 g BYK® 346 was added. Using the resultant mixture, cuboid carbon/carbon samples were given two coats, by brush. The samples were then cured using a standard thermal cycle and dipped for 30 minutes in a 25 w/w potassium acetate solution. The samples were then dried. Samples were oxidation tested in still air at 550° C. for 8 hours and recorded an average weight loss of 0.62%.

Primer Coat 2 (CE029W): In another example, 20 g of aluminum hydroxide was combined with 95 g of orthophosphoric acid. This combination was placed on a beaker on a hot plate. 65 g of demineralised water was added while stirring. The combination was allowed to cool, then a mixture of 1 g of Levasil® 200N (30%) and 0.3 g BYK® 348 was added. Using the resultant mixture, cuboid carbon/carbon samples were given two coats, by brush. The samples were then cured using a standard thermal cycle and dipped for 30 minutes in a 25 w/w potassium acetate solution. The samples were then dried. The samples were oxidation tested in still air at 550° C. for 8 hours and recorded an average weight loss of 0.29%.

Primer Coat 3 (CE021W): In another example, 20 g of aluminum hydroxide was combined with 95 g of orthophosphoric acid. This combination was placed on a beaker on a hot plate. 65 g of demineralised water was added while stirring. The combination was allowed to cool, and then 0.25 g BYK® 348 was added. Using the resultant mixture, cuboid carbon/carbon samples were given two coats, by brush. The samples were then cured using a standard thermal cycle and dipped for 30 minutes in a 25 w/w potassium acetate solution. The samples were then dried. The samples were oxidation tested in still air at 550° C. for 8 hours and recorded an average weight loss of 0.19%.

Barrier Coat 1 (AS3): In another example, 20 g of Levasil® 200N (30%) and 40 g of silicon hexaboride were added to 50 g of Primer Coat 3 (CE021W). The combination was mixed using a high speed dispersion mixer (or a bead mix could be used) to achieve good dispersion. Using the resultant mixture, cuboid carbon/carbon samples were given one coat of Primer Coat 3 (CE021W), applied using a spray gun. The samples were then dried for 1 hour and cured using a standard thermal cycle. Two coats of Barrier Coat 1 (AS3) were applied using a spray gun. The samples were then cured using a standard thermal cycle and dipped for 30 minutes in a 25 w/w potassium acetate solution. The samples were then dried. The samples were oxidation tested in still air at 550° C. for 28 hours and recorded an average weight loss of 0.91%.

Barrier Coat 2 (AS8): In another example, 17 g of Levasil® 200N (30%), 17.5 g of amorphous boron, and 17.5 g of silicon hexaboride were added to 50 g of Primer Coat 3 (CE021W). The combination was mixed using a high speed dispersion mixer (or a bead mix could be used) to achieve good dispersion. Using the resultant mixture, cuboid carbon/carbon samples were given one coat of Primer Coat 3 (CE021W), applied using a spray gun. The samples were then dried for 1 hour and cured using a standard thermal cycle. Two coats of Barrier Coat 2 (AS8) were applied using a spray gun. The samples were then cured using a standard thermal cycle and dipped for 30 minutes in a 25 w/w potassium acetate solution. The samples were then dried. The samples were oxidation tested in still air at 550° C. for 28 hours and recorded an average weight loss of 0.18%.

Various modifications and alterations that do not depart from the scope and spirit of this invention will become apparent to those skilled in the art. This invention is not to be duly limited to the illustrative embodiments set forth herein.

What is claimed is:

1. A carbon article formed as a brake disc, the brake disc being coated with an anti-oxidant coating, the anti-oxidant coating, as applied, comprising:
    orthophosphoric acid, aluminum hydroxide,
    demineralized water, a wetting additive,
    colloidal silica, silicon hexaboride, and boron.

2. The carbon article of claim 1, wherein the anti-oxidant coating comprises aluminum phosphate in an amount from 5 wt. % to 25 wt. %.

3. The carbon article of claim 2, wherein the anti-oxidant coating comprises demineralized water in an amount from 25 wt. % to 45 wt. %, the wetting additive in an amount from 0.1 wt. % to 1 wt. %, and colloidal silica in an amount from 10 wt. % to 25 wt. %.

4. The carbon article of claim 3, wherein the anti-oxidant coating comprises silicon hexaboride in an amount from 0.01 wt. % to 30 wt. % and boron in an amount from 0.01 wt. % to 30 wt. %.

5. The carbon article of claim 1, wherein the anti-oxidant coating further comprises industrial methylated spirits.

6. A method of providing an anti-oxidant coating to a carbon article shaped as a brake disc, the method comprising the steps of:
    applying as a primer coat a composition comprising orthophosphoric acid, aluminum hydroxide, demineralized water, and a wetting additive;
    curing the primer coat;
    applying as a barrier coat a composition comprising orthophosphoric acid, aluminum hydroxide, demineralized water, colloidal silica, silicon hexaboride, boron, and a wetting additive; and
    curing the barrier coat.

7. The method of claim 6, wherein the pre-cured primer coat comprises orthophosphoric acid in an amount from 45 wt. % to 65 wt. %, aluminum hydroxide in an amount from 5 wt. % to 15 wt. %, demineralized water in an amount from 20 wt. % to 45 wt. %, and the wetting additive in an amount from 0.1 wt. % to 1 wt. %.

8. The method of claim 7, wherein the pre-cured barrier coat comprises orthophosphoric acid in an amount from 20 wt. % to 40 wt. %, aluminum hydroxide in an amount from 3 wt. % to 9 wt. %, colloidal silica in an amount from 10 wt. % to 25 wt. %, demineralized water in an amount from 10 wt. % to 25 wt. %, silicon hexaboride in an amount from 0.01 wt. % to 30 wt. %, boron in an amount from 0.01 wt. % to 30 wt. %, and a wetting additive in an amount from 0.05 wt. % to 0.6 wt. %.

9. The method of claim 6, wherein the pre-cured primer coat further comprises an additional component selected from the group consisting of colloidal silica, industrial methylated spirits, and combinations thereof.

* * * * *